Sept. 22, 1959 W. MIEHLE 2,905,833

LOGICAL MAGNETIC CIRCUITS

Filed May 17, 1954 2 Sheets-Sheet 1

INVENTOR
WILLIAM MIEHLE
BY
Laurence R. Brown
ATTORNEY

| T2 | T3 | Eo |
|---|---|---|
| 0 | 0 | 1 |
| 0 | 1 | 1 |
| 1 | 0 | 0 |
| 1 | 1 | 1 |

| A | B | Eo |
|---|---|---|
| 0 | 0 | 1 |
| 0 | 1 | 0 |
| 1 | 0 | 0 |
| 1 | 1 | 1 |

INVENTOR
WILLIAM MIEHLE
BY
Laurence R. Brown
ATTORNEY

United States Patent Office 2,905,833

Patented Sept. 22, 1959

2,905,833

LOGICAL MAGNETIC CIRCUITS

William Miehle, Havertown, Pa., assignor to Burroughs Corporation, Detroit, Mich., a corporation of Michigan Application May 17, 1954, Serial No. 430,277

5 Claims. (Cl. 307—88)

This invention relates to logical electronic circuits and methods, and more particularly it relates to the operation of static magnetic storage elements in performing logical functions of the type used in digital computing systems.

It is necessary in operating automatic electronic computing equipment to provide circuits for performing logical operations. For example, in the performance of arithmetic manipulations in computer circuits, logical functions are frequently encountered which indicate the mixed presence and absence of a plurality of possible input signal pulses. One such circuit is used in obtaining an output signal when one of two possible input signal pulses is present and the other is absent. This circuit is known as an "exclusive or" circuit since it denotes the presence of pulses from either of two input signal sources A and B without indicating the presence of pulses from both signal sources. "Exclusive or" circuits are used in obtaining the sum of two binary bits.

Static magnetic storage elements have been suggested for performing this and other types of logical operations by M. K. Haynes in the 1950 University of Illinois thesis entitled "Magnetic Cores as Elements of Digital Computing Systems." In this thesis the operation of magnetic storage elements in performing different binary logical operations is described. However, the proposed circuits in general depend upon both coincidence in time and amplitude discrimination of input signal pulses. This causes the circuits to be critical in operation and subject to error in the presence of spurious noise pulses. It is therefore an object of the present invention to provide more reliable circuits for performing logical functions which avoid critical operation and are substantially less responsive if not completely non-responsive to spurious noise pulses.

Static magnetic binary storage elements in general utilize core materials having substantially rectangular hysteresis characteristics and tend to remain in a permanent magnetic remanence condition in response to the application of a saturating magnetic flux. The storage state of such elements may be determined at any time by providing an interrogation saturation flux of a known polarity. The interrogating flux source induces a large signal voltage pulse in transformer windings about the core when the remanence condition is changed from one polarity to another. However, when the interrogating flux leaves the core in the same remanent condition, very little output signal is induced. Thus, the storage state is compared with the known polarity of the interrogation flux. It is desirable to operate the magnetic storage elements in this well known manner to afford logical operations. In accordance with the present invention, such conventional magnetic storage elements are operated in such a manner that logical functions are obtained reliably and quickly and with a minimum number of magnetic elements.

It is, therefore, an object of the present invention to provide improved magnetic circuits for performing logical functions.

Another object of the invention is to provide logical functions for producing an output signal pulse from one or more magnetic storage elements in response to the mixed presence and absence of a plurality of input pulses from separate signal sources.

A further object of the invention is to provide improved "exclusive or" circuits.

A still further object of the invention is to provide improved methods of operating static magnetic storage elements in order to obtain output signal pulses denoting the performance of logical manipulations.

In accordance with the present invention, therefore, magnetic storage elements are utilized to perform logical functions by providing output signal pulses denoting the presence of a particular single input signal pulse from one or more sources. Thus, where only two signal sources present pulses to a magnetic storage element, one pulse is caused to dominate the other in accordance with the invention in order to provide the storage of the desired logic. The interrogation is thereafter performed in such a polarity that an output signal occurs. Where more than two signal sources present corresponding signal pulses, one pulse is dominated by the presence of any of the other signal pulses. In this method of operating the magnetic storage elements, such logic as the "exclusive or" function is readily performed.

An important feature of the invention is the more reliable operation possible than heretofore in logical circuits, since the dominating signal provided in accordance with the invention may be used to prevent spurious output pulses during the course of storing logic in the elements.

Other objects, advantages, and meritorious features of the invention will be found throughout the following more detailed description of the invention and the accompanying drawings, wherein.

Figure 1:
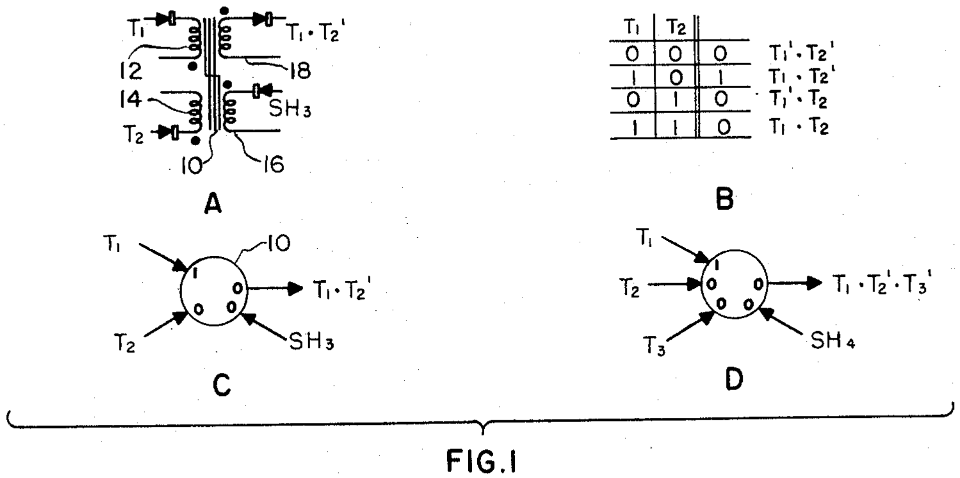
Fig. 1 shows schematic and logical diagrams of magnetic storage elements used in the present invention, together with a truth table illustrating different possible input and output signal combinations with the notation "1" indicating the presence of a signal pulse and "0" indicating the absence.

The notation used in the schematic circuit embodiments of the invention is described with reference to Fig. 1*a*. A magnetic core 10 is schematically drawn to indicate a material having a rectangular hysteresis characteristic and the capability of being shifted to one or the other of two binary storage states and the propensity of remaining in the state to which it is shifted. About this core 10 are several transformer windings 12, 14, 16 and 18, each including a series diode which indicates the direction of current flow through the respective windings. In this embodiment of the invention, windings 14 and 12 are employed for the input of signals, winding 16 is the interrogating means and winding 18 is the output signal means. When the cores are operated with input direct current signal pulses of a single polarity, these diodes need not be used in the input windings 12, 14 and 16. In the drawing the diodes however illustrate the polarity of pulses required for operation. The diode in the output winding 18 is used to permit an output current only when the element is switched from one storage condition such ing "1's and "0's." These subscript notations of these of the windings the dot notation is used to indicate the direction of the flux established in the windings by current flow from an external source. Thus, if current flows into the end of the winding at which the dot is located it will provide the remanent condition in the storage element which may be arbitrarily designated as the "0" remanence state. Conversely, if current flows into an undotted end or terminal it will establish the opposite remanence condition "1."

About the magnetic core 10 are the two signal input windings 12 and 14 which may be supplied by input signals $T_1$ and $T_2$ from a pair of separate signal pulse sources. Signals T etc. represent composite input signals including "1's" and "0's." These subscript notations of these signals $T_1$ and $T_2$ indicate that the separate signals from the two sources arrive in respective time sequence during the sequential time periods $t_1$ and $t_2$. Information is represented by on-off type binary signal conditions which produce current flow from signal pulses designating the condition "1" only. Therefore the presence of a signal pulse indicates current flow to the respective input windings for establishing saturation flux in the core 10. Because of the diodes in input windings 12 and 14 the core is set in opposing conditions "1" and "0" by signal pulses from signals $T_1$ or $T_2$. Since the pulses of signal $T_2$ arrive in a later time sequence than those from the signal $T_1$, the $T_2$ signal is caused to dominate the storage action of signal $T_1$. This feature is important in performing logical functions in accordance with the teachings of the present invention.

The shift or interrogation winding 16 operates in a conventional manner to restore the core to its "0" state and thereby provide output signal pulses from winding 18 if the storage state of the core is "1" at the time the interrogation pulse is applied. As indicated by the output signal notation $T_1.T_2'$, the output signal is provided when pulses from the signal $T_1$ are present and pulses from the signal $T_2$ are not present. This term is logically known as (($T_1$) and (not $T_2$)).

In tracing through the operation of the element of Fig. 1*a* in the manner afforded by the invention, consider the truth table of Fig. 1*b*, where it is noted that a particular output signal is provided from each of four possible input signal conditions. Assuming the core 10 to be in the "0" state because of a previous shift pulse $SH_3$ at a third time period $t_3$, no output pulse is produced by an input signal at either input winding 12 or 14 because the element is switched from "0" to "1" and the diode associated with winding 18 prevents current flow.

For the input signal condition $T_1'.T_2'$, where no signal pulse appears at either winding, the storage state remains undisturbed. Since the element remains in a "0" storage condition, the succeeding shift pulse, through winding 16, does not provide an output pulse at winding 18.

However, for the second input condition $T_1.T_2'$, pulses from the signal $T_1$ will provide a storage state of "1" in the core 10, which is not disturbed at time $t_2$ because of the absence of pulses from signal $T_2$. Upon read out, therefore, a change in remanence state of the core 10 from "1" to "0" is provided, and accordingly an output signal pulse is produced denoting the logic $T_1.T_2'$.

For the third signal condition, $T_1'.T_2$, the absence of pulses from input signal $T_1'$ leaves the core undisturbed and at "0" state. Likewise pulses from the input signal $T_2$, even though present, cause current to enter the dotted terminal of winding 14 and therefore do not disturb the "0" stored state. Accordingly, no output signal pulse is provided in the presence of the interrogation signal $SH_3$.

For the fourth input signal condition $T_1.T_2$, the input winding 12 will cause a "1" to be stored in the core 10 in response to pulses from signal $T_1$, and the input winding 14 will cause the element 10 to be reset to its "0" condition by the dominating pulses from the $T_2$ signal. Because of the change from "1" to "0" storage state, an output signal is afforded at this time, which may be inhibited in the output circuit if not desired. Should the output circuit only be responsive at the time when the interrogation $SH_3$ occurs, inhibiting is not necessary. It is evident, therefore, that no output signal pulse is provided except for the second signal condition $T_1.T_2'$. With the method of operation described, it is seen that the logical function ($T_1$ and not $T_2$) is performed in a single magnetic storage element. Moreover, in a similar manner the converse function $T_1'.T_2$ may be performed by merely interchanging input windings 12 and 14.

In order to simplify the presentation of further embodiments of the invention, the logical notation of Fig. 1*c* is utilized. The magnetic storage element 10 is designated by the circle, and the respective input windings are designated by arrows entering the circle together with the supplied signal designation. The notation "1" or "0" at the end of the arrows determines the condition to which the element is driven in the presence of a signal pulse at that lead, regardless of the former storage state. The one output winding is designated by the lead leaving the circle, and the binary notation "0" at the output lead designates the state to which the core must be switched in order to provide an output signal. Thus, the logical diagram of Fig. 1*c* represents identically the magnetic storage element schematically shown in Fig. 1*a*.

The method of operation may be extended in the manner show in Fig. 1*d* to include further input signals from further sources such as $T_3$ arriving in a further time sequence period $t_3$. In this case the shift pulse arrives at time $t_4$ after a complete input cycle. The time sequence of the further signal pulses is not important, as long as they arrive in a time period later than that in which the $T_1$ signal pulses arrive, and therefore the signals $T_2$ and $T_3$ may even be coincident in time, if desired. However, pulses from any one of signals $T_2$ and $T_3$ are caused to dominate the action of pulses from signal $T_1$ in order to provide the desired output logic $T_1.T_2'.T_3'$. In this manner where a plurality of more than two signals is afforded, pulses from one signal are dominated by pulses from the remainder of signals to cause storage of a logical resultant signal which indicates the mixed presence and absence of pulses from the particular designated input signals.

Figure 2:
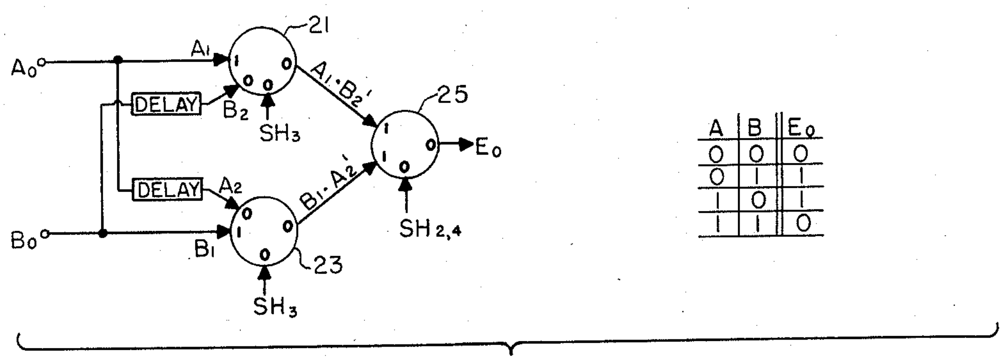
Fig. 2 is a logical circuit diagram of an "exclusive or" circuit embodying the invention.

In Fig. 2 a logical diagram of an "exclusive or" circuit is shown together with the accompanying truth table. Each of the magnetic storage elements 21 and 23 operate in a manner identical to that described in connection with Figs. 1*a* and *c*. By coupling thereto to receive output signals from both elements a further magnetic storage element 25 which operates as a well known (inclusive) "or" circuit to determine the presence of an output signal from either or both of storage elements 21 and 23, it is seen that the "exclusive or" function defined by the accompanying truth table is performed. The "or" circuit accompanying storage element 25 tends to produce an output signal $E_0$ when either (A and B') or (B and A') or both is present. However, both may not be present at the same time because of the operation of the logical elements 21 and 23, and therefore the output signal provides a true "exclusive or" indication.

In operating a time sequential "exclusive" or circuit of the type shown in Fig. 2, it is necessary to provide inhibiting means when a conventional "or" circuit is used, such as designated by element 25. Thus, consider the storage element 21 in the presence of pulses from both an A and B signal. At time $t_2$ the element is returned to its "0" state thereby affording a spurious output pulse which will store a "1" in element 25 unless otherwise inhibited by the provision of the shift or interrogating pulse $SH_2$ which overcomes the incoming spurious pulse. Otherwise, only the shift pulse $SH_4$ would be necessary.

Figure 3:
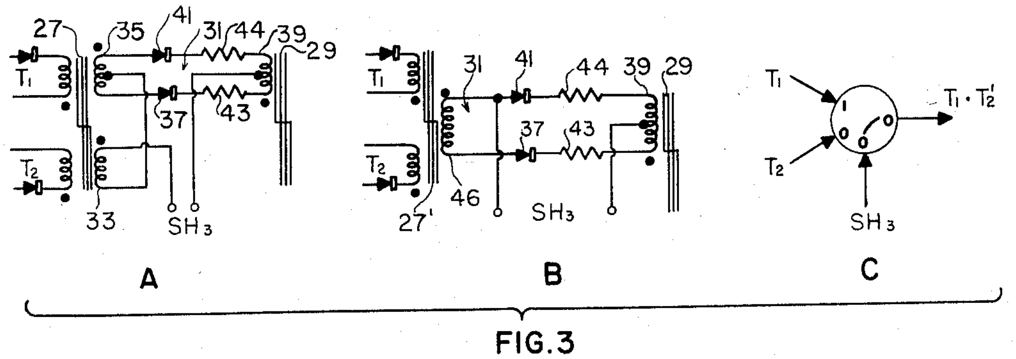
Fig. 3 shows circuit and logical diagrams of an improved type of magnetic element used with the present invention.

By utilizing an improved magnetic storage circuit such as shown schematically in Fig. 3*a*, the output circuit of element 29 is entirely isolated from the logical manipulations being performed within the logical storage element 27. This circuit may be termed a conditional transfer circuit since changes of the storage state of core 27 may cause a pulse to be transferred to core 29 only upon the condition that the shift current pulse $SH_3$ is present. This type of conditional transfer circuit is described and claimed in the copending application of John O. Paivinen, Serial No. 762,863, filed September 23, 1958, entitled "Magnetic Shift Register," which is a continuation, inter alia, an earlier-filed application, Serial No. 420,135, filed March 31, 1954, entitled "Magnetic Device," which, in turn, is a continuation-in-part of a still earlier application, S.N. 396,604, filed December 7, 1953, now abandoned.

Conditional transfer is effected by means of the split winding transfer loop 31. Operation of the conditional transfer loop 31 is initially dependent upon current flow in the interrogation winding 33 which returns the core 27 to its "0" state in a conventional manner to thereby produce a large signal voltage in the split output winding 35. Because of the presence of the output signal pulse upon switching of core 27, the lower diode 37 in the transfer loop has less than half the total current flowing therethrough, thus causing the shift current to flow almost entirely through the upper half of the split winding and through the upper section of the input winding 39 upon the receiving core 29. The current flow through the upper diode 41 which is in excess of that through the diode 37 will cause a resultant saturating flux in core 29 which places the core in its "1" storage condition, thereby effecting a transfer of a stored "1" from core 27 to core 29. Conversely, when a "0" is stored in core 27, little potential will result in winding 35 and the shift current therefore will divide evenly in the two sections of the transfer loop and cause equal and opposite flux to be established in core 29. This flux leaves core 29 in its "0" state. By inclusion of the current limiting resistors 43 and 44, current balance is maintained during this latter operation, thereby minimizing the noise or partial switching which otherwise might be produced during the transfer of a "0."

Switching the core 27 by other means than current flow through winding 33 will cause a potential to be induced in the split winding 35. However, diodes 37 and 41 prevent current flow through winding 39 and core 29 sees no noise or spurious output pulse. Therefore, an inhibiting circuit for preventing transfer of unwanted information between two adjacent cores is unnecessary with conditional transfer circuits.

An alternative conditional transfer circuit operating in much the same manner is that shown in Fig. 3*b*, wherein the output winding 46 on core 27' serves the dual function of interrogation and conditional transfer. This alternate type of conditional transfer circuit is described and claimed in copending application of John O. Paivinen, S.N. 762,863, filed September 23, 1958, entitled "Magnetic Shift Register," which is a continuation, inter alia, of an earlier-filed application S.N. 396,603, filed December 7, 1953, entitled "Magnetic Device," now abandoned. Thus, when a "1" is stored in element 27', the current which would otherwise tend to flow unimpeded from the shift pulse terminal through winding 46 and the lower diode 37, will be reduced. The unbalanced current therefore tends to store a signal in element 29 in the same manner as described in connection with Fig. 3*a*. Likewise, when no signal is stored in core 27', little opposition would be afforded to current flow through winding 46, and the resulting balanced current through the split winding 39 will cause the element 29 to remain in its initial storage condition.

Consider the operation of the conditional transfer network 31 of Fig. 3*a* in the presence of a pulse from signal $T_2$ subsequent to the presence of a pulse from input signal $T_1$. At this time in the hereinbefore described circuit, an output signal is developed which is unconditionally transferred from core 27 to core 29. However, with the split transfer loop 31, even though a potential is induced in winding 35 because of switching of the core 27 from the "1" to the "0" condition, no current flows which can store a signal in the receiving core 29 because of the diodes 37 and 41 and the absence of shift current $SH_3$. The same is true in Fig. 3*b* where the diodes prevent transfer of the induced spurious pulses in winding 46. Thus, only those pulses are transferred which occur simultaneously with the conditional transfer shift current which flows through the coupling circuit diodes and thereby cause an unbalanced flux in the receiving element 29. The shift winding in the embodiment of Fig. 3*a* is provided to simultaneously interrogate the transmitting core and pass the enabling current through the transfer loop 31 for performing the transfer operation. If desired, a separate interrogation winding may be used, and the enabling current flowing in the transfer loop 31 will determine the period during which signal pulses may be transferred from core 27 to core 29.

The logical notation for conditional transfer circuits of this type is shown in Fig. 3*c*, wherein the eyebrow connection between the shift and output windings indicates that an output signal pulse is produced for transfer only in response to a shift pulse. Otherwise, the notation is the same as that hereinbefore described.

Figure 4:
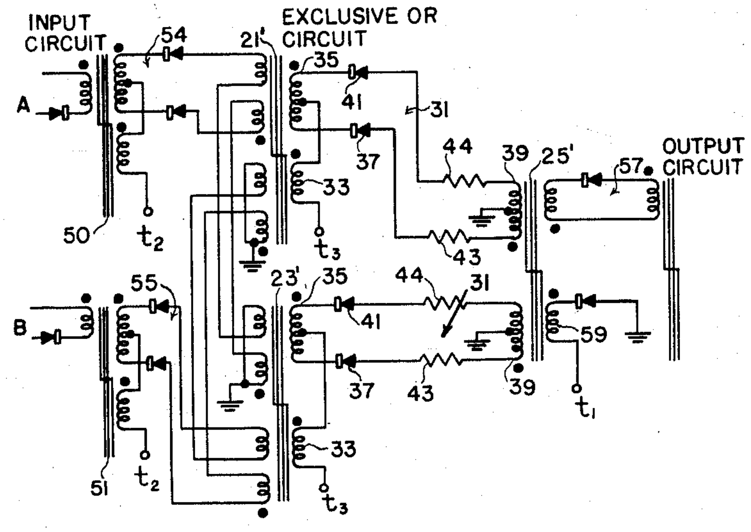
Fig. 4 is a schematic circuit diagram of a further "exclusive or" circuit embodiment of the invention.

In Fig. 4 an "exclusive or" circuit, together with input and output storage elements, is schematically shown for operation with the improved split winding conditional transfer loops. In this circut the two input signals A and B are applied to the input storage elements 50 and 51 during a time period $t_1$. However, it is not necessary that the two input signals A and B be applied simultaneously to the storage elements 50 and 51; they could be applied consecutively within the time period $t_1$. The storage elements 50 and 51 are simultaneously interrogated by driving current through the conditional transfer circuits 54 and 55 of the respective storage elements 50 and 51 during the time period $t_2$. The conditional transfer loops 54 and 55, coupling the input circuit to the "exclusive or" circuit, are connected so that the input signals A and B, if any, are simultaneously transferred to both of the "exclusive or" storage elements 21' and 23'. Each logical element 21' and 23' is connected to the "or" element 25' by means of conditional transfer loops of the same nature described in connection with Fig. 3*a*, which are labeled with similar reference characters for purpose of comparison. The transfer loop 57 between the "or" element 25' and the output circuit is a conventional unconditional transfer circuit which is interrogated at winding 59 during the time period $t_1$ to transfer the information stored in element 25' to the output circuit. No spurious pulses are provided back to the input circuit storage elements 50, 51 from the "exclusive or" circuit, however, because of the conditional transfer loops 54, 55. Thus, even though one of the "exclusive or" circuit storage elements 21' and 23' has its storage state switched from "1" to "0" in a manner that would otherwise provide an output signal pulse in an unconditional storage transfer circuit, it will not cause backward current flow in the transfer loop windings of input circuit storage elements 50 or 51. From this manner of operation it is readily recognized that improved circuit operation may be afforded without the effect of spurious output indications while the logical circuit operations are being performed.

Figure 5:
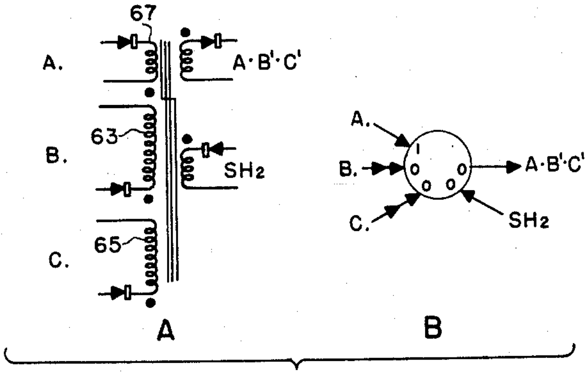
Fig. 5 is a schematic circuit diagram of a magnetic storage element illustrating further operational conditions of the invention together with an accompanying logical diagram.

The dominant signal necessary for logical operation in accordance with the teaching of the invention also may be provided with coincident input signals in the manner designated by the circuit diagram of Fig. 5*a*. This operation is desirable when the entire logical operation should be performed during two sequential time periods. The hereinbefore described time sequential circuits require three sequential time periods for completing the logical operation. Pulses from the dominating signals $B_1$ or $C_1$ of Fig. 5*a* are caused to produce a greater amplitude flux than pulses from the dominated signal $A_1$ by means of input windings 63 and 65 having more turns than input winding 67. Here signal pulses of the same amplitude are presumed, but any other manner of obtaining a greater number of ampere-turns would likewise be suitable. Dominant signals are shown in the logical diagram of Fig. 5*b* by the double headed arrows.

In this manner should pulses from signals $A_1$ and $B_1$ be present at the same time, pulses from the signal $B_1$ will retain the storage condition in the "0" reset condition because of current entering the dotted terminal of the winding 63. Likewise, pulses from signal $C_1$ will dominate pulses from signal $A_1$, and should pulses from both signals $B_1$ and $C_1$ arrive, the effect is the same since it will only tend to drive the flux within the core of the storage elements into "0" saturation. In order to operate in accordance with this aspect of the invention with two input signals, pulses from one signal are caused to dominate pulses from the other. With more than two input signals, pulses from one signal are dominated by those from the remaining signals to provide the mixed output logic $A \cdot B' \ldots N'$. In each case, to obtain this type of logic, the output signal is obtained by interrogating the storage element to return it to the storage condition which is also established in the presence of pulses from the dominating signals.

Figure 6:
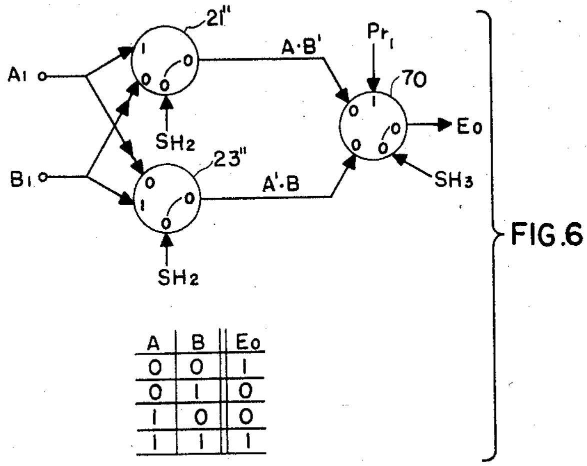
Fig. 6 is a logical diagram of a material equivalence circuit embodiment of the invention.

This mode of operation is illustrated in the logical diagram of Fig. 6 for providing the logical result signifying the presence of two of four possible signal conditions. When both input signals are the same an output signal pulse is provided by this circuit, which therefore perform the material equivalence function. This function results from the negation of the "exclusive or" function as may be determined by comparing the truth tables and logical diagrams of Figs. 2 and 6. Therefore, in Fig. 6 the "exclusive or" function would be obtained from elements 21″ and 23″ and the "or" function of core 70, and the negation function is provided by presetting the element 70 during the initial time period $t_1$ to the "1" state. Accordingly, the presence of a signal pulse from either element 21″ or 23″ will cause the storage element 70 to be placed in the "0" storage state upon the presence of a shift pulse $SH_2$ during the time period $t_2$. Since the element 70 is switched from a "1" to "0" condition, at a time an output signal pulse is not desired, a conditional transfer output circuit is provided so that an inhibiting pulse is not necessary. As hereinbefore described, this is designated by the eyebrow connection linking the windings interrogated by the $SH_2$ pulse with the output windings. Because of the present condition in element 70, an output signal pulse is provided by the $SH_3$ pulse only if the conditional "or" combination does not occur. Thus, the material equivalence function is performed.

Figure 7:
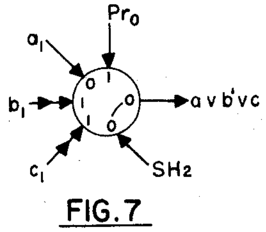
Figs. 7 and 8 are logical diagrams showing further logical operations afforded by the invention.
Figure 8:
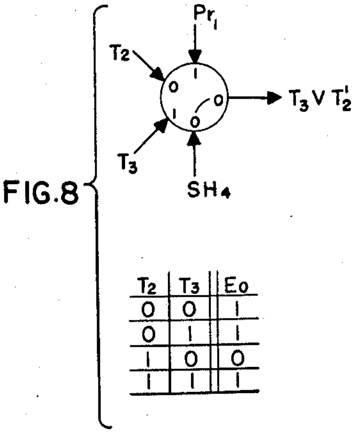

Other forms of logic may be derived by the use of dominating signals in the manner afforded by this invention as shown in Figs. 7 and 8. In each case the conditional transfer circuit is provided since spurious signals would otherwise be provided while the logic is being performed in the storage elements. The addition of the preset pulse enables the storage elements to perform the "or" ($\vee$) function of Fig. 7 and the function of Fig. 8 designated by the accompanying truth table which might logically be described as $T_3$ or not $T_2$ ($T_3 \vee T_2'$). Other logical functions may be performed in the same general manner by those skilled in the art.

It is seen from the foregoing description of the invention and its mode of operation with static magnetic storage elements that improved logical operation is afforded in a manner that no adverse effects are caused by the presence of spurious signals during the course of logical manipulations. In this manner, the performance of logic in a single storage element is facilitated in a manner not possible with prior art devices. Those novel features believed descriptive of the nature and scope of the invention are defined with particularity in the appended claims.

I claim:

1. A circuit for performing the "Exclusive Or" logical function A Or B, But Not A And B, said circuit comprising, first, second, third, fourth and fifth magnetic cores each capable of assuming either of two stable states of magnetic remanence one of which is a "set" state and the other a "reset" state; means on said first core responsive to an A input signal, if any, during a time period $t_1$ for placing said first core in the "set" state; means on said second core responsive to a B input signal, if any, during said time period $t_1$ for placing said second core in the "set" state, said A and B pulses, if any, occurring either simultaneously or consecutively in either order during said time period $t_1$; a first conditional transfer loop coupling said first core to first input windings on each said third and fourth cores; a second conditional transfer loop coupling said second core to second input windings on each said third and fourth cores, said first and second input windings on each said third and fourth cores being poled to establish flux of opposite polarities; means effective during a time period $t_2$ for driving shift current simultaneously through said first and second conditional transfer loops to switch either said first or second core or both from the "set" to "reset" state and in response to such switching to switch either said third or fourth core but not both to the "set" state, said first and second conditional transfer loops being effective, in the event that both said first and second cores are switched from the "set" to the "reset" state during said time $t_2$ to exert bucking and canceling magnetomotive forces on said third and fourth core, thereby to inhibit the switching of either said third or fourth cores during the time period $t_2$; a third conditional transfer loop coupling said third core to said fifth core; a fourth conditional transfer loop coupling said fourth core to said fifth core; and means effective during a time period $t_3$ for driving shift current through said third and fourth conditional transfer loops to switch or to tend to switch either said third or fourth core from the "set" to the "reset" state and in response thereto to effect switching of said fifth core to the "set" state, said time periods $t_1$, $t_2$, and $t_3$ occurring in that order; and means for deriving an output signal from said fifth core.

2. Apparatus as claimed in claim 1 characterized in that said means for driving shift current through said third and fourth conditional transfer loops is effective to drive said current simultaneously through said third and fourth loops.

3. Apparatus as claimed in claim 1 characterized in that each of said first and second conditional transfer loops which couple said first and second cores to said third and fourth cores includes a pair of balanced input windings on each said third and fourth cores through which said shift current flows at time $t_2$ to establish opposing, equal and canceling magnetomotive forces in both the third and fourth cores in the absence of the switching of the associated first or second cores of said loop, but through which said shift current flows to establish unequal magnetomotive forces in both said third and fourth cores in the presence of the switching of the associated first or second core of said loop and thereby to effect switching of either said third or fourth core.

4. Apparatus as claimed in claim 1 characterized in that each of said third and fourth conditional transfer loops which couple said third and fourth cores to said fifth core includes a pair of balanced input windings on said fifth core through which said shift current flows during time $t_3$ to establish opposing, equal and canceling magnetomotive forces in said fifth core in the absence of the switching of the associated third or fourth core of said loop, but through which said shift current flows to establish unequal magnetomotive forces in said fifth core in the presence of the switching of the associated third or fourth core of said loop, thereby to effect switching of said fifth core.

5. Apparatus as claimed in claim 3 characterized in that each of said third and fourth conditional transfer loops which couple said third and fourth cores to said fifth core includes a pair of balanced input windings on said fifth core through which said shift current flows during time $t_3$ to establish opposing, equal and canceling magnetomotive forces in said fifth core in the absence of the switching of the associated third or fourth core of said loop, but through which said shift current flows to establish unequal magnetomotive forces in said fifth core in the presence of the switching of the associated third or fourth core of said loop, thereby to effect switching of said fifth core.

References Cited in the file of this patent

UNITED STATES PATENTS

| | | |
|---|---|---|
| 2,666,151 | Rajchman | Jan. 12, 1954 |
| 2,685,653 | Or et al. | Aug. 3, 1954 |
| 2,695,993 | Haynes | Nov. 30, 1954 |
| 2,766,388 | Wulfing | Oct. 9, 1956 |

OTHER REFERENCES

"Magnetic Binaries in the Logical Design of Information Handling Machines," by Saunders in Proceedings of Association for Computing Machinery, May 1952 (pp. 223–229).

"Boolean Algebra in Electronic Circuit Design," by Washburn in Electrical Engineering, February 1954.

UNITED STATES PATENT OFFICE

CERTIFICATE OF CORRECTION

Patent No. 2,905,833 September 22, 1959

William Miehle

It is hereby certified that error appears in the printed specification of the above numbered patent requiring correction and that the said Letters Patent should read as corrected below.

Column 3, line 6, strike out "ing "1's and "0's." These subscript notations of these" and insert instead -- as "1" to the opposite storage condition "0". At each --; column 7, line 55, for "present" read -- preset --.

Signed and sealed this 30th day of August 1960.

(SEAL)
Attest:

ERNEST W. SWIDER
Attesting Officer

ROBERT C. WATSON
Commissioner of Patents